(12) United States Patent
Liu (10) Patent No.: US 8,335,244 B2
(45) Date of Patent: Dec. 18, 2012

(54) DATA TRANSMISSION METHOD, NETWORK DEVICE, AND COMMUNICATION SYSTEM

(75) Inventor: Yongjun Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/040,649

(22) Filed: Mar. 4, 2011

(65) Prior Publication Data

US 2011/0150042 A1 Jun. 23, 2011

Related U.S. Application Data

(63) Continuation of application No. PCT/CN2009/073743, filed on Sep. 4, 2009.

(30) Foreign Application Priority Data

Sep. 5, 2008 (CN) .......................... 2008 1 0212922

(51) Int. Cl.
*H04B 1/69* (2006.01)

(52) U.S. Cl. ........ 375/133; 375/132; 375/135; 375/134; 455/426.1; 455/450

(58) Field of Classification Search .................. 375/133, 375/132, 134; 370/315, 349, 329
See application file for complete search history.

(56) References Cited

U.S. PATENT DOCUMENTS

| | | | |
|---|---|---|---|
| 6,366,602 B1 | 4/2002 | Raitola | |
| 7,965,681 B2 * | 6/2011 | Berglund et al. | 370/329 |
| 2002/0142779 A1 * | 10/2002 | Goto et al. | 455/450 |
| 2003/0031231 A1 | 2/2003 | You et al. | |
| 2004/0170217 A1 * | 9/2004 | Ho | 375/134 |
| 2005/0083896 A1 | 4/2005 | Hong et al. | |
| 2005/0286467 A1 | 12/2005 | Chang et al. | |
| 2006/0089138 A1 * | 4/2006 | Smith et al. | 455/426.1 |
| 2008/0107157 A1 | 5/2008 | De Ruijter | |
| 2009/0168744 A1 * | 7/2009 | Park | 370/349 |
| 2010/0296434 A1 * | 11/2010 | Amagai et al. | 370/315 |

FOREIGN PATENT DOCUMENTS

| | | |
|---|---|---|
| CN | 1210635 A | 3/1999 |
| CN | 1758294 A | 4/2006 |
| CN | 101193054 A | 6/2008 |
| WO | 2007137001 A2 | 11/2007 |

OTHER PUBLICATIONS

First office action issued in corresponding Chinese patent application No. 200810212922.3 , dated Aug. 3, 2012, and English translation thereof, total 15 pages.
Written opinion&search report issued in corresponding PCT patent application No. PCT/CN2009/073743,dated Dec. 10, 2009, 11 pages total.

(Continued)

*Primary Examiner* — Eva Puente (57) ABSTRACT

A data transmission method, a network device, and a communication system are provided. The method includes: acquiring a frequency hopping time period and frequency hopping information when reliable transmission is required; transmitting data according to the frequency hopping information in the frequency hopping time period. Thus, the reliability of data transmission is ensured, the original network is not changed significantly, and the system overhead and resources are saved.

7 Claims, 5 Drawing Sheets

OTHER PUBLICATIONS

IEEE 802.15: "15/08/0409-04-004e-time-slotted-channel-hopping-mac-proposal",Dust Network, Freescale, Jul. 2008. 33 pages total.
ZigBee Alliance: "064677r00ZB_WSN-TSMP_Proposal_Slide",Dust Network,dated Dec. 7, 2006, 13 pages total.
Peng Yu: "New trends and standard's development of realizing wireless communication in automation and control environment. Automation panorama." Apr. 2007 total 6 pages.

* cited by examiner

DATA TRANSMISSION METHOD, NETWORK DEVICE, AND COMMUNICATION SYSTEM

CROSS-REFERENCE TO RELATED APPLICATIONS

This application is a continuation of International Application No. PCT/CN2009/073743, filed on Sep. 4, 2009, which claims priority to China Patent Application No. 200810212922.3, filed on Sep. 5, 2008, both of which are hereby incorporated reference in their entireties.

FIELD OF THE TECHNOLOGY

The present invention relates to the field of network communication technology, and particularly to a data transmission method, a network device, and a communication system.

BACKGROUND OF THE INVENTION

The wireless sensor network is a new technology, and the network is formed by a large number of low-cost mini-sensor devices arranged in a monitoring area. Generally, the sensor devices have a simple structure, low energy consumption, and low cost, so the reliability thereof cannot be ensured.

However, in actual applications, some requirements for Quality of Service (QoS) indexes including the reliability must be met in some cases, for example, the control application of an industrial environment, and the issuance and notification of some important information. Accordingly, some technologies for solving the QoS problems such as the reliability are proposed.

The most direct method for improving the reliability of data transmission is to retransmit messages to ensure the reliability of the data sending. For example, if a sending device does not receive a response, it sends the message again, till a response is received or maximum sending times are reached. Although the method is simple, the ensurance for reliability is not enough. In addition, the inventors found that this solution at least has the following problems. The retransmission is equivalent to time diversity and does not have obvious effect for resisting long-term interference, that is, the retransmission mechanism cannot resist the long-term interference suffered by the device. Furthermore, the retransmission increases the delay of information transmission, while reliability and low delay are both required for some critical data, so the retransmission is not always suitable. Additionally, the retransmission also consumes more energy.

To ensure the reliability of the data sending, when the distance between devices remains unchanged, the signal transmission power of a transmitter can be increased. For example, a signal amplification circuit is added at the signal transmitter, and the original output signal is amplified and then transmitted. This solution is simple and easy to implement, and is applicable in many scenarios. However, the inventors found that this solution at least has the following problems. Higher signal transmission power will result in more energy consumption, thus for the wireless sensor devices with a battery as the energy source, more battery energy is consumed if the transmission power is increased, the life of the device is reduced, and the operation cost of the network is increased. Moreover, as the signal is transmitted omnidirectionally, and the increased signal received by the receiver is but a small part of the increased transmission power due to the limit on the receiving range, the increase of the transmission power does not have obvious effect on the receiving effect of the receiver. Further, the increase of the transmission power of a single device will increase the interference on devices nearby, thus the background noise of other devices is increased, and the reliability of data transmission of other devices is lowered.

SUMMARY OF THE INVENTION

Embodiments of the present invention provide a data transmission method, a network device, and a communication system.

An embodiment of the present invention provides a data transmission method. The method includes:

acquiring a frequency hopping time period and frequency hopping information when reliable transmission is required; and transmitting data according to the frequency hopping information in the frequency hopping time period.

An embodiment of the present invention provides a network device. The device includes:

an acquiring module, configured to acquire a frequency hopping time period and frequency hopping information when reliable transmission is required.

a transmitting module, configured to transmit data according to the frequency hopping information in the frequency hopping time period.

An embodiment of the present invention provides a communication system. The system includes:

a coordinator, configured to communicate with a network device, wherein the coordinator is configured to allocate a frequency hopping time period and frequency hopping information when reliable transmission is required, so that the network transmits data according to the frequency hopping information in the frequency hopping time period. According to the embodiments of the present invention, the data is transmitted in a frequency hopping mode in the time slot when the reliable data transmission is required, so as to reduce the system overhead as much as possible on the basis that the reliability of important data transmission is ensured.

DETAILED DESCRIPTION OF THE EMBODIMENTS

In a wireless sensor network, as the devices have a simple structure, and the function does not need to be complex, it is difficult to use complicated hardware technologies to ensure the reliability of information transmission. Therefore, improvements can be made in the information transmission mode. As for the channel transmission mode, if the whole network uses the same channel, the information transmission between the devices may collide with each other, resulting in lower reliability of information transmission. If any of the import information is transmitted with normal information in a uniform and hybrid manner, the overall performance of the network may be weakened. Therefore, it is desired to transmit the information separately by adopting different transmission modes or transmission channels on the basis that the levels of the information to be transmitted or the transmit devices are distinguished, so as to improve the reliability of the important information transmission, and enhance the overall transmission performance of the network.

According to the communication modes, wireless sensor networks are categorized into beacon enabled networks and non-beacon enabled networks. In a beacon enabled network, a coordinator in the network sends a beacon frame periodically, and the devices in the network are synchronized by using the beacon frame sent by the coordinator. In a non-beacon enabled network, all the devices will not send a beacon frame periodically, the communication between the devices is generally asynchronous, the devices do not know the state of each other, and the devices communicate with each other through exploration. That is, one party continuously sends explorer frames, and sends a data frame when the other party responds.

In the beacon enabled network, the communication between the devices in the network may be organized with superframes as a period. Each superframe starts with a beacon frame sent by the coordinator in the network, and the beacon frame contains information such as the duration of the superframe and the allocation of the period of time. After a common device in the network receives the beacon frame at the start time of the superframe, the device arranges the tasks according to the content of the beacon frame, for example, staying in a dormant state till the superframe is completed. The superframe divides the communication time into two parts, that is, active time and inactive time. In the inactive time, the devices in the network will not communicate with each other, thus entering the dormant state to save energy. The active time of the superframe is divided into three stages, namely, a beacon frame sending period, a contention access period (CAP), and a contention free period (CFP). The active part of the superframe is divided into 16 time slots with an equal length, and the parameters such as the length of each time slot and the number of time slots included in the CAP are set by the coordinator, and are broadcast to the whole network through the beacon frame at the start time of the superframe. In the CAP, the network devices communicate by using a Carrier Sense Multiple Access with Collision Avoidance (CSMA-CA) mechanism, and all communications are completed before the CAP ends. The CSMA-CA is a random channel access mode, and means that: to avoid collision, a network device needs to monitor the channel before sending the data, and confirm that the channel is idle before sending the data; if the channel is busy, the network device will retreat at random time, so as to avoid collision when the device retreats at the same time; after retreating, the network device monitors the channel again, till the channel is idle, and then sends the data, or the process ends when specified maximum retreating times are reached. In the CFP, the coordinator divides the CFP into several GTSs according to the GTS applied by the network device in the previous superframe period. The GTS is a dedicated time slot, and is applied in the communication of a specific device, that is, other devices cannot communicate within the GTS applied by a device, and the time slot is uniquely used by the device applying for the time slot, such that the data collision is reduced. In the CAP, the network devices transceive the data freely, the network devices apply for GTSs from the coordinator, and new devices are added into the current network. In the CFP, the devices specified by the coordinator send or receive the data.

In order to ensure the reliability and delay of the transmission of any of the important information in the wireless sensor network, a specific time period can be arranged for both parties of the communication to ensure the communication. That is, to ensure that the transmission of the part of important information will not be interfered by the communication of nearby devices. For example, in the channel contention free period, the coordinator allocates the GTSs applied by the devices in advance, so in the time slot processes of the data transmission, the communication between the devices is ensured to be free of impact and collision. However, the method only considers the avoidance of collision in the communication of the internal network, but does not consider the problems of external interference and fading channels, while the communication on only one channel cannot meet the requirements for high reliability. Thus, in the channel contention free period, in addition to ensuring the uniqueness of time of the important information communication by adopting the GTS mode, the singularity of the communication in terms of the communication frequency must be ensured as well. Therefore, in the guaranteed time period, special processing can be performed on the important information transmission of the devices to switch the current transmission channel to other channels with good communication quality, so as to reduce the interference. In one word, the current GTS mechanism is improved by introducing the function of frequency hopping.

The data transmission method of the embodiments of the present invention includes the following steps. When a reliable transmission is required, a frequency hopping time period and frequency hopping information are acquired. In the frequency hopping time period, data is transmitted according to the frequency hopping information. That is, a network device transmits the data in a frequency hopping mode in the time period that reliable data transmission is required. By performing frequency hopping processing in specific time periods, that is, by performing frequency hopping processing only in the time period when the reliable data transmission is required, the overall overhead of the system may be reduced as much as possible on the basis of ensuring the reliability of data transmission.

The data transmission method of the embodiments of the present invention further includes the following step: the network device or a coordinator divides the data to be transmitted into important data and non-important data according to the system conditions or preset conditions. In the acquired frequency hopping time period, the important data is transmitted in a frequency hopping mode. As for the non-important data, the non-important data is transmitted in a non-frequency hopping mode.

By dividing the data, the important data is processed by complex frequency hopping, and thus the system overhead may be reduced as much as possible on the basis of ensuring the reliability of the important data transmission.

The determination of the time period and frequency hopping mode are described in the following embodiments.

The synchronization of the sending end device and the receiving end device and the determination of the frequency hopping information are the important basis for implementing the normal frequency hopping communication. Thus, the sending end device and the receiving end device need to negotiate with each other to determine the frequency hopping information and synchronization information. The frequency hopping information includes, for example, a frequency hopping channel sequence, a size of the frequency hopping channel sub-time slot, and a frequency hopping random number. The frequency hopping channel sequence is configured to determine the channel for the communicating. The size of the frequency hopping channel sub-time slot is configured to determine the start-stop time of each used channel. The frequency hopping random number is configured to determine the frequency hopping pattern, that is, the variation rule of channels. The synchronization information includes the synchronization period and the synchronization time of both parties of the communication.

The wireless sensor networks are categorized into beacon enabled networks and non-beacon enabled networks. In a beacon enabled network, the network devices may synchronize by using the beacon frame sent by the coordinator. In a non-beacon enabled network, no beacon frame is sent periodically, so the network devices cannot be synchronized by using the beacon frame. Therefore, the two networks need to be synchronized in different modes, which are described in the following embodiments. The synchronization modes described below are not limited to the two networks, and may also be applied in other networks.

In the beacon enabled networks, the network device that intends to transmit the data may directly request the FH-GTS from the coordinator. The FH-GTS determines the dedicated time period, and the data is transmitted in the frequency hopping mode in the dedicated time period. Alternatively, the network device may request a common GTS from the coordinator, and negotiate with the coordinator to determine the frequency hopping information. Alternatively, the coordinator actively allocates the FH-GTS to the network device as required.

Figure 1:
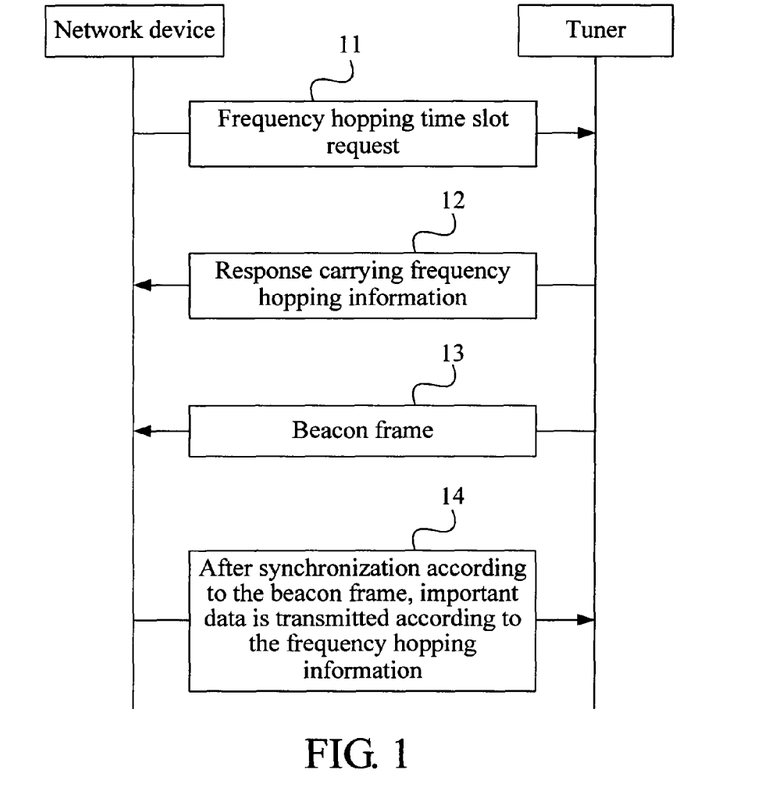
FIG. 1 is a flow chart of Embodiment 1 of a data transmission method according to the present invention.

FIG. 1 is a flow chart of Embodiment 1 of a data transmission method according to the present invention. The data transmission method includes the following steps:

In Step 11, the network device (the device that intends to transmit the data) sends an FH-GTS request to a coordinator.

As for important data, the device requests the FH-GTS from the coordinator. As for non-important data, the network device may request the GTS from the coordinator according the prior art, so as to acquire a common communication channel. On the basis of distinguishing the importance of the data information content, only important information is transmitted in the frequency hopping mode. Thus, on the basis of ensuring the reliability of data transmission, the system overhead of whole network frequency hopping is reduced as much as possible, and the network resources are saved.

According to the introduction of the beacon enabled network, when one superframe ends, the network device will request a GTS from the coordinator according to the communication requirements, and the GTS may ensure that the communication between the devices will not have collision and ensure the information communication's uniqueness of time. However, in the common GTS stage, the carrier frequency for data transmission is fixed, that is, the frequency channel adopted by both parties of the communication is single, so it is difficult to resist the external interference and the influence of fading channels.

In this embodiment, the FH-GTS not only has the functions of the common GTS. In the FH-GTS stage, the data may be transmitted on several channels consecutively, that is, the frequency hopping function is realized. The coordinator and the network device may negotiate with each other to determine the target channel for frequency hopping. The determination mode may be as follows: the coordinator scans the currently available communication channels in advance, so as to find a series of channels with good communication quality as channel sequence for communication in the FH-GTS. The FH-GTS request command sent by the device to the coordinator may specify the possible frequency hopping channels and the frequency hopping mode to be adopted, and may also carry no channel parameters.

Figure 2:
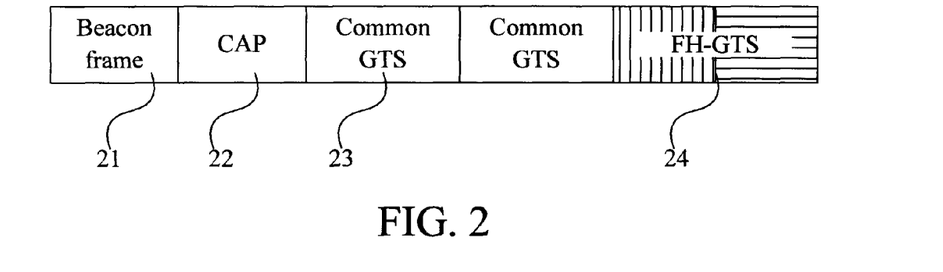
FIG. 2 is a schematic structural view of a superframe structure in a data transmission method according to an embodiment of the present invention.

FIG. 2 is a schematic structural view of a superframe structure in a data transmission method according to an embodiment of the present invention. The superframe structure includes a beacon frame 21 for synchronization, a CAP 22, a common GTS 23 for ensuring the dedicated time, and an FH-GTS 24 for frequency hopping communication. According to the embodiment, only a command for changing the transmission channel is added to the original superframe structure without changing the original data structure, and no change is made to the physical layer technology, so the superframe structure has better compatibility.

Furthermore, the coordinator may also directly deliver the FH-GTS information as required, and the network device does not need to initiate the request.

Step 11 is optional.

In Step 12, after receiving the FH-GTS request, the coordinator may directly provide the frequency hopping negotiation response command, or provide a notification of the allocated FH-GTS in the beacon frame of the next superframe. In FIG. 1, for example, a response carrying the frequency hopping information is returned. The response command or notification may carry the parameters such as the network address of the requesting device, the start time and the length (in a unit of ms) of the FH-GTS, and the frequency hopping information (including the frequency hopping start channel, the frequency hopping sequence, the frequency hopping random number). The frequency hopping random number is configured to calculate the frequency hopping channel sequence, for example, only the 11th, 15th, 19th, and 23rd channels are used to perform the frequency hopping, the random number is x, and the next frequency hopping channel is determined by adopting the algorithm of $(x+3)\%4$. The frequency hopping sequence is optimally generated by a random number generator, and in simple cases, the random frequency hopping may be omitted.

In Step 13, the network device monitors the beacon frame sent by the coordinator, and is synchronized according to the synchronization information in the beacon frame.

Here, the timing for executing Step 1 and Steps 11-12 is not limited.

In Step 14, after the network device receives the frequency hopping negotiation response or the FH-GTS allocation notification sent by the coordinator, as for the important data, the network device communicates with the coordinator in the FH-GTS in the current superframe period. That is, after synchronizes according to the beacon frame, the important data is transmitted according to the frequency hopping information. The communication of all the data may be performed in the FH-GTS.

In the allocated FH-GTS, the coordinator and the device are switched to the channel that was negotiated in advance for communication. The FH-GTS may include a plurality of frequency hopping channel sub-time slots, or FH-GTSs of a plurality of cycles may also form a frequency hopping channel sub-time slot. In each frequency hopping channel sub-time slot, both parties of the communication work on the same channel. When one frequency hopping channel sub-time slot ends and the next frequency hopping channel sub-time slot starts, the channel is generally switched according to the frequency hopping sequence, so as to realize the frequency hopping. For example, in IEEE802.15.4, at the working frequency band of 2.4 GHz, the size of the GTS is specified to be $n\times0.96\times2^{SO}$ ms, in which, $1\leq n\leq15$, SO is the parameter indicating the duration of the superframe, and at the working frequency band of 2.4 GHz, the duration of the superframe is $15.36\times2^{SO}$ ms. The length of the frequency hopping channel sub-time slot may be specified to be $0.96\times2^k$ ms. If $n\times0.96\times2^{SO}\leq0.96\times2^k$, the FH-GTSs of one or more cycles form a frequency hopping channel sub-time slot, that is, the channel is not switched in the same FH-GTS, and the communication channel is switched after several beacon cycles. If $n\times0.96\times2^{SO}>0.96\times2^k$, one FH-GTS includes a plurality of frequency hopping channel sub-time slots, that is, in the FH-GTS, both parties of the communication switch the working channel on time according to the length of the sub-time slot, so as to ensure the normal communication. If n=1, SO=10, and k=8, each FH-GTS includes 4 sub-time slots, and both parties of the communication switch to the channel that is negotiated in advance at the start of each sub-time slot, so as to implement the frequency hopping communication.

When implementing the frequency hopping technology, in the embodiment of the present invention, according to the communication requirements of the devices, the devices that need to communicate to select the channels in advance according to result of channel scanning. Thus, the communication quality of the important new channels is ensured, and the reliability of the important information transmission is enhanced.

In this embodiment, the synchronization is performed by using the beacon frame sent by the coordinator, and the network device applies for the FH-GTS having a dedicated time slot and frequency hopping function to the coordinator at one time.

In this embodiment, the communication between the coordinator and the device is performed in the frequency hopping mode only when the reliable communication is required, thus the reliability is ensured, while at other time, the communication is performed according to the prior art, that is, in the non-frequency hopping mode. Both parties of the communication send the data on the same working channel (unless the working channel is switched integrally), and thus the compatibility is ensured, and only the data that needs to be maintained by the frequency hopping is maintained, thus the simplicity of the device and low cost are ensured. Furthermore, at other time, the non-frequency hopping of the prior art is adopted, such that the original properties of the device such as the mobility and rapid connection are maintained. When the device applies for the FH-GTS to the coordinator, it may firstly apply for a common GTS, and then apply for the frequency hopping communication in the GTS. For example, when the communication starts, the requirement for reliability is not high, and only a common GTS is used for communication, and in order to improve the reliability, the device sends a frequency hopping request to the coordinator.

Figure 3:
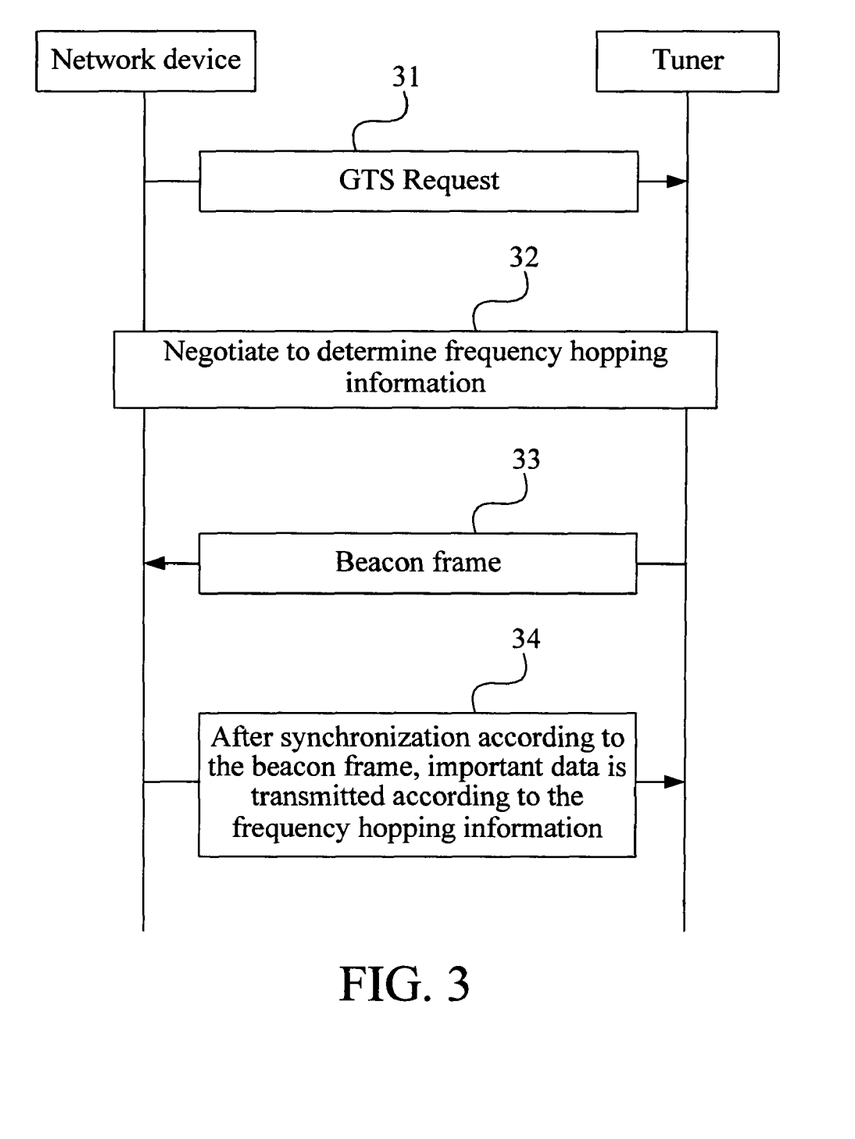
FIG. 3 is a flow chart of Embodiment 2 of a data transmission method according to the present invention.

FIG. 3 is a flow chart of Embodiment 2 of a data transmission method according to the present invention. The data transmission method includes the following steps.

In Step 31, the network device firstly sends a GTS request to the coordinator, which is the same as that in the prior art, and may be performed by using the current mechanism for requesting the GTS.

In Step 32, the network device negotiates with the coordinator to determine the frequency hopping information.

In Step 33, the network device receives the beacon frame sent by the coordinator, and synchronizes according to the beacon frame.

In Step 34, after synchronizes, the network device transmits the important data by using the negotiated frequency hopping information at the applied GTS stage. Similar to the Embodiment 1, all the data may be transmitted according to the frequency hopping information in the GTS.

Similar to the Embodiment 1, the synchronization is performed by using the beacon frame sent by the coordinator in this embodiment. However, the difference lies in that, in the Embodiment 1, the time period and frequency hopping information of the communication are acquired at one time, and in this embodiment, the time period and frequency hopping information are acquired respectively in two times.

According to this embodiment, the communication between the coordinator and the device is performed in the frequency hopping mode only when the reliable communication is required, so as to ensure the reliability; at other time, the communication is performed according to the prior art, that is, in the non-frequency hopping mode. Both parties of the communication send the data on the same working channel (unless the working channel is switched integrally), and thus the compatibility is ensured, and only the data that needs to be maintained by the frequency hopping is maintained, thus the simplicity of the device and low cost are ensured. Furthermore, at other time, the non-frequency hopping of the prior art is adopted, such that the original properties of the device such as the mobility and rapid connection are maintained.

Whether the synchronization performed by using the beacon is enough according to this embodiment is analyzed as follows. Taking IEEE802.15.4 for example, in the beacon enabled network, the working frequency band is the frequency band higher than 2.4 GHz; if at each superframe period, the device can monitor the beacon successfully, because the length of the superframe is $15.36\times2^{SO}$ ms, and the common clock precision of the current wireless sensor network device may reach ±40 ppm if it is required that the error caused by the clock deviation is lower than ±1 ms, the inequality $15.36\times2^{SO}\times40\times10^{-6}<1$ is satisfied, that is, $SO\leq10$. As the frequency hopping channel sub-time slot is generally greater than 10 ms, the error of ±1 ms may ensure the normal frequency hopping communication. If the frequency hopping channel sub-time slot has a greater value, SO may also has a greater reasonable range, which indicates that in a longer superframe, the frequency hopping mode may be adopted. In the case that SO is too great, or the beacon is missed in a beacon cycle, such that the clock error exceeds the expected value, both parties of the communication may synchronize additionally. For example, the device requests to acquire the beacon that has not been received in the channel CAP, or sends a synchronization request command, the coordinator provides the synchronization information such as timestamp information, that is, the time from the start time of the beacon of the cycle, in the additional beacon or in a synchronization response command, and the device adjusts the local time according to the time, so as to realize the synchronization. If the additional synchronization cannot be completed, the device may also re-synchronize in the allocated FH-GTS. Due to the temporary loss of synchronization and the clock error, in a frequency hopping channel sub-time slot, the device cannot determine whether the parties of the communication have been switched to the channel. Therefore, the device cannot re-synchronize at all the time in the period.

Figure 4A:
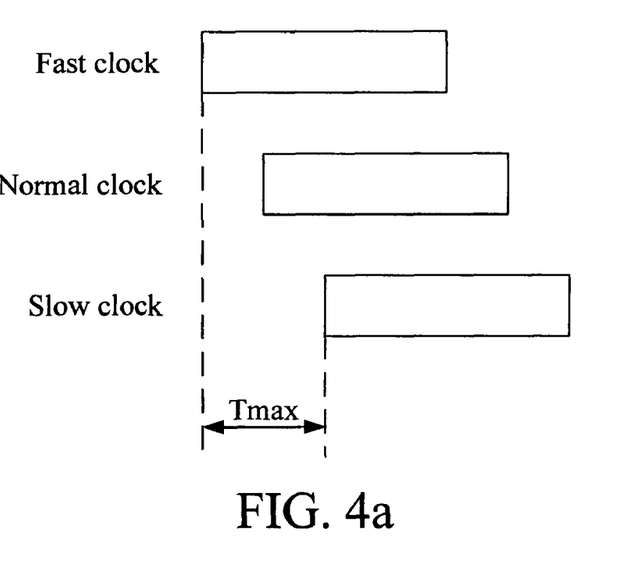
FIG. 4a is a schematic view of a signal with clock error in a data transmission method according to an embodiment of the present invention.
Figure 4B:
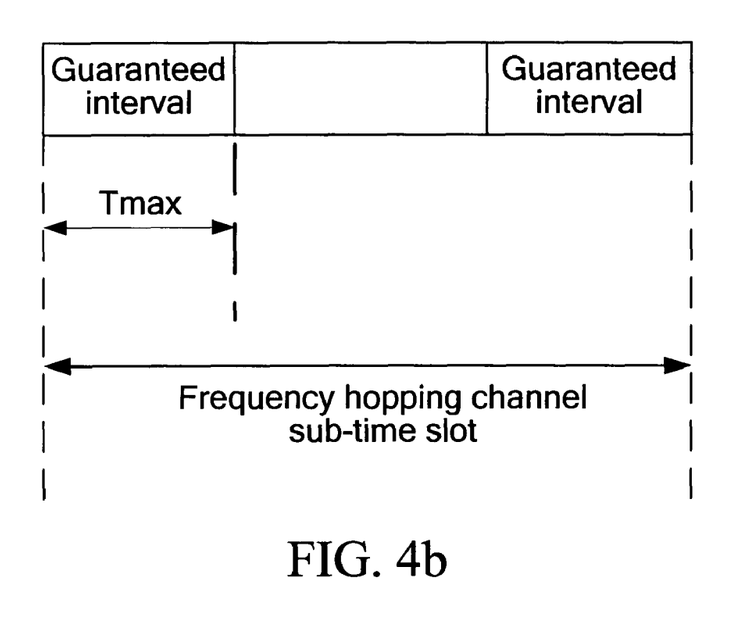
FIG. 4b is a schematic structural view of a frequency hopping channel sub-time slot in a data transmission method according to an embodiment of the present invention.

FIG. 4a is a schematic view of the signal with clock error in a data transmission method according to an embodiment of the present invention, in which a maximum clock error T max exists between the fast clock and the slow clock. FIG. 4b is a schematic structural view of the frequency hopping channel sub-time slot in a data transmission method according to an embodiment of the present invention. Due to the clock error shown in FIG. 4a, the re-synchronization cannot be performed at all periods of the frequency hopping channel sub-time slot. In a frequency hopping channel sub-time slot, the time of a length of T max at a head and an end is considered as the guaranteed interval, and in the time therebetween, it is affirmed that the device works at the same channel with the counterpart of the communication, so the re-synchronization operation may be performed. In the example, if SO=10, the maximum time error of each superframe is about ±0.63 ms, if the duration of the frequency hopping channel sub-time slot is 30.72 ms, during the time period, the time of 2×0.63=1.26 ms at the head and end may be considered as the guaranteed interval, and in the time period therebetween, the re-synchronization operation may be performed. Alternatively, the re-synchronization may be a common synchronization process, that is, the beacon frame is not used, and the synchronization process is performed by directly using the time period in the middle of the frequency hopping channel sub-time slot.

Figure 5:
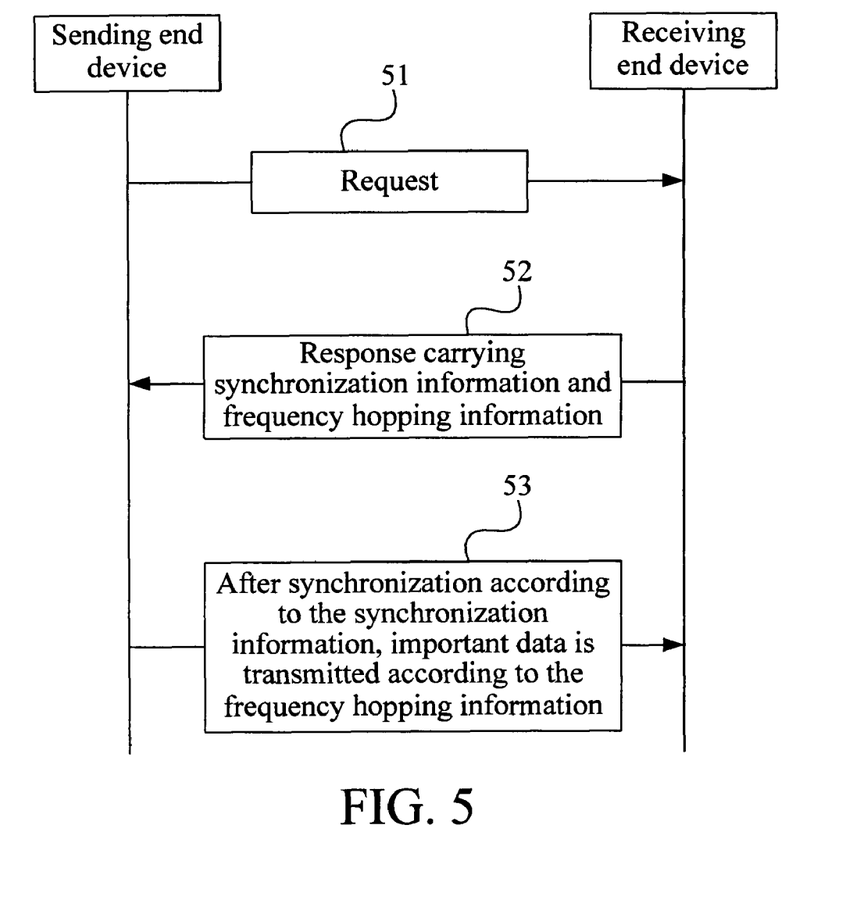
FIG. 5 is a flow chart of Embodiment 3 of a data transmission method according to the present invention.

FIG. 5 is a flow chart of Embodiment 3 of a data transmission method according to the present invention. The data transmission method includes the following steps.

In Step 51, the sending end device divides the data to be transmitted into important data and non-important data; when the important data needs to be transmitted, a request for reliable transmission is sent to the receiving end device. The request may carry the parameters such as the bandwidth requirements.

In Step 52, if the receiving end device agrees to perform reliable transmission, it sends a response carrying the synchronization information and frequency hopping information to the sending end device. The response may further carry a frequency hopping time period.

In Step 53, after synchronizes according to the synchronization information sent by the receiving end device, the sending end device transmits the important data to the receiving end device according to the frequency hopping information.

In the first and second embodiments, the present invention is described by taking the beacon enabled network for example, in which the synchronization is implemented by using the beacon frame. However, in other networks, for example, in a non-beacon enabled network, the superframe structure is not provided, and the periodical beacon for synchronization is not provided either. If both parties of the communication intend to perform reliable communication, they may firstly establish the synchronization, and then negotiate the time period of the frequency hopping communication. The synchronization information represents the cycle of the synchronization and the time of the synchronization between two parties of the communication. For example, the device of one party receives a response, and monitors the synchronization data sent by the device of the other party after a specific time, in which the synchronization data is sent periodically. The synchronization data sent periodically may also be attached in the data packet as a timestamp and sent. The negotiated frequency hopping time period may represent the time length from the start time of the periodical communication between the devices of two parties of the communication to the synchronization data and duration of the frequency hopping time, so as to ensure that two parties of the communication start to communicate in the negotiated time period simultaneously. The frequency hopping information includes the information such as the frequency hopping channel sequence, the size of the frequency hopping channel sub-time slot, and the frequency hopping random number, so as to ensure that the communication parties perform the channel switch synchronously, and perform normal frequency hopping communication. For communication in the time out of the frequency hopping time period agreed by the parties, the non-frequency hopping mode is still adopted to implement communication in a single working channel.

This embodiment does not use the beacon frame for synchronization, but performs the synchronization through synchronous negotiation between both parties of the communication.

In this embodiment, the communication between the coordinator and the device is performed in the frequency hopping mode only when the reliable communication is required, and thus the reliability is ensured. However, at other time, the communication is performed according to the prior art, that is, in the non-frequency hopping mode. Both parties of the communication send the data on the same working channel (unless the working channel is switched integrally), and thus the compatibility is ensured, and only the data that needs to be maintained by the frequency hopping is maintained, thus the simplicity of the device and low cost are ensured. Furthermore, at other time, the non-frequency hopping of the prior art is adopted, such that the original properties of the device such as the mobility and rapid connection are maintained.

Persons of ordinary skill in the art should understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a magnetic disk, a Compact Disk Read-Only Memory (CD-ROM), a Read-Only Memory (ROM) or a Random Access Memory (RAM).

Figure 6:
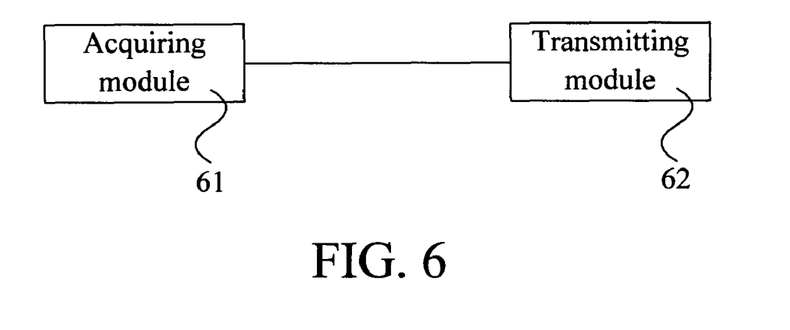
FIG. 6 is a schematic structural view of an embodiment of a network device according to the present invention.

FIG. 6 is a schematic structural view of an embodiment of a network device according to the present invention. The network device includes an acquiring module 61 and a transmitting module 62. The acquiring module 61 is configured to acquire a frequency hopping time period and frequency hopping information when reliable transmission is required. The transmitting module 62 is configured to transmit data according to the frequency hopping information in the frequency hopping time period.

The acquiring module 61 is specifically configured to receive an FH-GTS and the frequency hopping information allocated by a coordinator, and the transmitting module 62 is specifically configured to transmit the data according to the frequency hopping information in the FH-GTS stage after synchronizes according to a beacon frame sent by the coordinator.

Alternatively, the acquiring module 61 is configured to receive a GTS allocated by a coordinator, and negotiate with the coordinator to determine the frequency hopping information, and the transmitting module 62 is specifically configured to transmit the data according to the frequency hopping information at the GTS stage after synchronizes according to a beacon frame sent by the coordinator.

Alternatively, the acquiring module 61 is specifically configured to negotiate with a receiving end device to determine synchronization information, the frequency hopping time period, and the frequency hopping information, and the transmitting module 62 is specifically configured to transmit the data according to the frequency hopping information in the frequency hopping time period after synchronizes according to the synchronization information.

Alternatively, the network device may further include a dividing module, which is configured to divide the data to be transmitted into important data and non-important data, and the transmitting module is specifically configured to transmit the important data in a frequency hopping mode in the frequency hopping time period.

This embodiment reduces the system overhead as much as possible on the basis of ensuring the reliability of important data transmission, and the implementation is simple.

Figure 7:
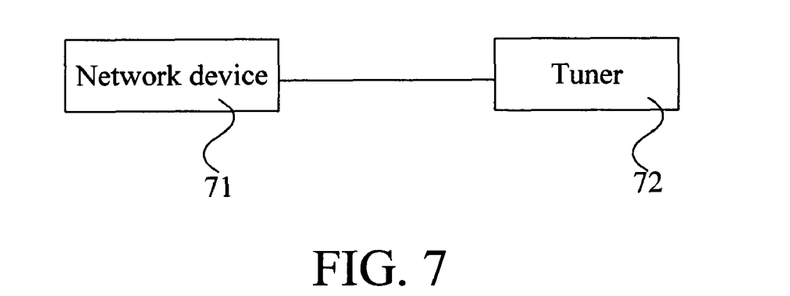
FIG. 7 is a schematic structural view of Embodiment 1 of a communication system according to the present invention.

FIG. 7 is a schematic structural view of a Embodiment 1 of a communication system according to the present invention. The communication system includes a network device 71 and a coordinator 72. The network device 71 is configured to receive a FH-GTS and frequency hopping information allocated by the coordinator 72. The coordinator 72 is configured to provide the FH-GTS and the frequency hopping information to the network device 71 and send a beacon frame to the network device 71. The network device 71 is configured to transmit data according to the frequency hopping information at the FH-GTS stage after synchronizes according to a beacon frame sent by the coordinator 72.

Alternatively, the network device 71 is configured to acquire a GTS from the coordinator 72 and negotiate with the coordinator 72 to determine frequency hopping information. The coordinator 72 is configured to provide the GTS to the network device 71 and send a beacon frame to the network device 71. The network device 71 is configured to transmit data according to the frequency hopping information in the GTS stage after synchronizes according to the beacon frame sent by the coordinator 72.

Alternatively, the network device 71 is further configured to divide the data to be transmitted into important data and non-important data, and transmit the important data in a frequency hopping mode in the corresponding frequency hopping time period.

In this embodiment, the data is divided to ensure the reliability of the important data transmission, and the beacon frame is used for synchronization. Therefore, this embodiment is applicable in the beacon enabled network.

Figure 8:
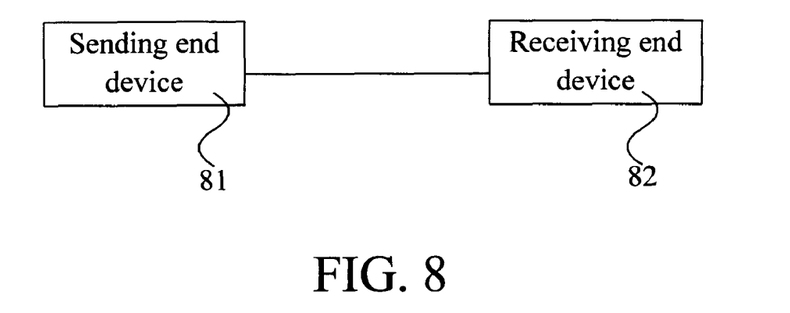
FIG. 8 is a schematic structural view of Embodiment 2 of a communication system according to the present invention.

FIG. 8 is a schematic structural view of Embodiment 2 of a communication system according to the present invention. The communication system includes a sending end device 81 and a receiving end device 82. The sending end device 81 and the receiving end device 82 are configured to negotiate to determine synchronization information, a frequency hopping time period, and frequency hopping information. The sending end device 81 is further configured to transmit data to the receiving end device 82 according to the frequency hopping information in the frequency hopping time period after synchronizes according to the synchronization information. Alternatively, the sending end device 81 is further configured to divide data to be transmitted into important data and non-important data, and transmit the important data to the receiving end device in a frequency hopping mode in the corresponding frequency hopping time period.

In this embodiment, both parties of the communication negotiate the synchronization and frequency hopping information, and it is unnecessary to send a beacon frame for synchronization. Therefore, this embodiment is applicable in the network without the beacon frame.

In the embodiment, the communication is described by taking unicast for example, that is, both parties of the communication negotiate the frequency hopping information or the synchronization information. However, the method is also applicable to multicast or broadcast. For example, when the coordinator allocates the FH-GTSs, the coordinator can negotiate with several network devices to determine the corresponding FH-GTSs. When the coordinator allocates the FH-GTSs, the FH-GTSs are allocated to the corresponding network devices in the multicast or broadcast mode. In communication, each network device communicates according to the negotiated frequency hopping information. That is, in the system, several devices may perform the frequency hopping communication simultaneously.

It should be noted that the above embodiments are merely provided for elaborating the technical solutions of the present invention, but not intended to limit the present invention. It should be understood by persons of ordinary skill in the art that although the present invention has been described in detail with reference to the foregoing embodiments, modifications or equivalent replacements may be made to the technical solutions without departing from the spirit and scope of the present invention.

What is claimed is:

1. A data transmission method, comprising:
   acquiring a frequency hopping time period and frequency hopping information when reliable transmission of important data is required, including receiving a frequency hopping guaranteed time slot (FH-GTS) as the frequency hopping time period and the frequency hopping information allocated by a coordinator; and transmitting the important data according to the frequency hopping information at the FH-GTS after synchronization according to the beacon frame sent by the coordinator.

2. The data transmission method according to claim 1, further comprising: sending an FH-GTS request;
   wherein the step of receiving the FH-GTS comprises:
   receiving a frequency hopping negotiation response command corresponding to the FH-GTS request sent by the coordinator or a notification of the FH-GTS allocated by the coordinator, wherein the frequency hopping negotiation response command or the notification of the FH-GTS carries the FH-GTS and the frequency hopping information.

3. A data transmission method, comprising:
   acquiring a frequency hopping time period and frequency hopping information when reliable transmission of important data is required, including receiving a guaranteed time slot (GTS) as the frequency hopping time period allocated by a coordinator and negotiating with the coordinator to determine the frequency hopping information; and
   transmitting the important data according to the frequency hopping information in the frequency hopping time period, including receiving a beacon frame sent by the coordinator, and transmitting the important data according to the frequency hopping information at the GTS after synchronization according to the beacon frame sent by the coordinator.

4. A network device, comprising:
   an acquiring module configured to receive a frequency hopping guaranteed time slot (FH-GTS) as a frequency hopping time period and frequency hopping information allocated by a coordinator when reliable transmission of important data is required; and
   a transmitting module configured to receive a beacon frame sent by the coordinator, and transmit the important data according to the frequency hopping information at the FH-GTS as the frequency hopping time period after synchronizing according to the beacon frame sent by the coordinator.

5. The network device according to claim 4, wherein
the network device is further configured to send an FH-GTS request; and
the acquiring module is configured to receive a frequency hopping negotiation response command corresponding to the FH-GTS request sent by the coordinator or a notification of the FH-GTS allocated by the coordinator, wherein the frequency hopping negotiation response command or the notification of the FH-GTS carries the FH-GTS and the frequency hopping information.

6. A network device, comprising:
an acquiring module configured to receive a guaranteed time slot (GTS) as a frequency hopping time period allocated by a coordinator, and negotiate with the coordinator to determine frequency hopping information when reliable transmission of important data is required; and
a transmitting module configured to receive a beacon frame sent by the coordinator, and transmit the important data according to the frequency hopping information at the GTS as the frequency hopping time period after synchronizing according to the beacon frame sent by the coordinator.

7. A communication system, comprising:
a coordinator configured to communicate with a network device; allocate a frequency hopping guaranteed time slot (FH-GTS) as a frequency hopping time period and frequency hopping information to the network device; and send a beacon frame to the network device when reliable transmission of important data is required;
and the network device configured to transmit the important data according to the frequency hopping information in the frequency hopping time period; or
the coordinator configured to allocate a guaranteed time slot (GTS) as a frequency hopping time period to the network device, negotiate with the network device to determine frequency hopping information; and send a beacon frame to the network device when reliable transmission of important data is required; and the network device configured to transmit the important data according to the frequency hopping information in the frequency hopping time period.

* * * * *